United States Patent [19]
Mori et al.

[11] Patent Number: 4,716,526
[45] Date of Patent: Dec. 29, 1987

[54] MULTIPROCESSOR SYSTEM

[75] Inventors: Shosuke Mori, Tokyo; Atsushi Sakurai, Fuchu; Satoshi Aoki; Tatsuya Suzuki, both of Tokyo, all of Japan

[73] Assignee: Fujitsu Limited, Kawasaki, Japan

[21] Appl. No.: 622,455

[22] Filed: Jun. 20, 1984

[30] Foreign Application Priority Data

Jun. 29, 1983 [JP] Japan ................ 58-115885

[51] Int. Cl.$^4$ ............................ G06F 15/16
[52] U.S. Cl. ............................ 364/200
[58] Field of Search ........ 364/704, 708, 200 MS File, 364/900 MS File; 361/413

[56] References Cited

U.S. PATENT DOCUMENTS

| | | | |
|---|---|---|---|
| 4,420,806 | 12/1983 | Johnson, Jr. et al. | 364/200 |
| 4,547,849 | 10/1985 | Louie et al. | 364/200 |
| 4,590,556 | 5/1986 | Berger et al. | 364/200 |
| 4,591,975 | 5/1986 | Wade et al. | 364/200 |

OTHER PUBLICATIONS

Hank Harrison, "CP/M-80 Expansion Card For The Victor 9000," Dr. Dobb's Journal, No. 76, Feb. 1983 pp. 58–61.
Micro Cornucopia Journal of the Big Board Users, Feb. 1983, p. 30.
Mark Pelczarski, "Microsoft Softcard," Byte Magazine, Nov. 1981, pp. 152–162.
Byte Magazine, Dec. 1982, p. 46.
David H. Ahl, "Digital Equipment Corporation Rainbow 100 Personal Computer," Creative Computing Magazine, Nov. 1982, pp. 10–31.

*Primary Examiner*—Eddie P. Chan
*Assistant Examiner*—Jonathan C. Fairbanks
*Attorney, Agent, or Firm*—Staas & Halsey

[57] ABSTRACT

A multiprocessor system used, for example, in a personal computer, wherein different types of microprocessors are used independently of the architecture of each microprocessor. The system includes a control register, a control circuit, and a common peripheral circuit mounted, for example, on a main board, and a plurality of kinds of microprocessors each mounted, for example, on a sub-board connected to the main board. The control circuit transmits a halt request signal to a first microprocessor which is currently operating, in response to coincidence between an output signal of the control register and the status signal indicating that a second microprocessor is in a halt condition, when the output signal of the control register is changed by the first microprocessor. Then, the control circuit releases a halt request signal applied to the second microprocessor in response to coincidence between a status signal indicating that the first microprocessor has entered into a halt condition and the output signal of the control register.

11 Claims, 3 Drawing Figures

MULTIPROCESSOR SYSTEM

BACKGROUND OF THE INVENTION

(1) Field of the Invention

The present invention relates to a multiprocessor system, more particularly to a multiprocessor system which is used, for example, in a personal computer and the like, and in which different kinds of processors are freely switched and used without depending upon the architecture of each processor.

(2) Description of the Prior Art

In recent years, microprocessors have been developed and manufactured by various companies, and each of these microprocessors is used, for example, in a personal computer. There have also been developed various types of software for each of these processors. However, most of these types of software usually cannot be used interchangeably between the different processors, and, therefore, it is necessary to use special techniques to enable the use of the different types of software developed for the various processors by a single personal computer.

In order to make it possible for a single computer system, such as a personal computer, to utilize as many types of software as possible, there are conventionally known personal computers each of which comprises a plurality of different processors in one personal computer and these processors can be switched to enable the utilization of software developed for different processors. For example, in an FM-8 type personal computer manufactured by Fujitsu Limited, it is possible to switch between the 6809 type processor manufactured by Motorola Semiconductor Products and an optional type Z80 type manufactured by Zilog Corporation, thereby enabling the utilization of each of these processors. In an Apple II type personal computer manufactured by Apple Computer Inc., U.S.A., it is possible to switch between a 6502 type processor manufactured by Mostek Corporation and the optional type Z80 processor manufactured by Zilog Corporation, thereby enabling the utilization of each of these processors.

However, in the above-mentioned conventional computer systems, it is only possible to switch between particular predetermined processors when wishing to utilize a different processor. It is impossible to switch between processors which are not predetermined, and therefore, it is impossible to make the greatest possible use of the software developed for various processors. Moreover, in the aforementioned conventional systems, a main processor is permanently mounted on a main printed circuit board, and a printed circuit board containing another optional processor is connected to the main printed circuit board by a connector. Therefore, the type of the main processor is limited to that which can be used with a particular type of computer system, and thus it is impossible to use all types of processors as the main processor.

SUMMARY OF THE INVENTION

In view of the above-mentioned problems of the conventional system, the present invention has an object of making it possible to connect a plurality of CPU boards, each mounting a processor thereon, to a common printed circuit board by using plug-in type connectors and the like, the common printed circuit board mounting a common memory circuit, an input/output interface circuit, and the like thereon.

Another object of the present invention to make it possible to freely switch between any kind of processor, without depending upon the architecture of each processor, and thus enabling the possible use of the software for each processor.

Still another object of the present invention is to make it possible to use any processor as the main processor so that a computer system may be used to the greatest possible extent in the field required.

According to the present invention, there is provided a multiprocessor system comprising: a plurality of different kinds of microprocessors; a peripheral circuit provided in common for those microprocessors; a control register accessible from each of the microprocessors; and a control circuit for controlling the switching operation of the microprocessors. The control circuit receives status signals from each of the microprocessors indicating that each microprocessor is in an operating or halt status, and receives an output signal from the control register. The control circuit transmits a halt request signal to one microprocessor in an operating status, in response to coincidence between an output signal of the control register and a status signal indicating that another microprocessor is in a halt status, when the output signal of the control register is changed by the one microprocessor. The control circuit releases a halt request signl applied to another microprocessor in a halt status in response to coincidence between a status signal indicating that the one microprocessor now has the halt status and the output signal of the control register.

DESCRIPTION OF THE PREFERRED EMBODIMENTS

Figure 1:
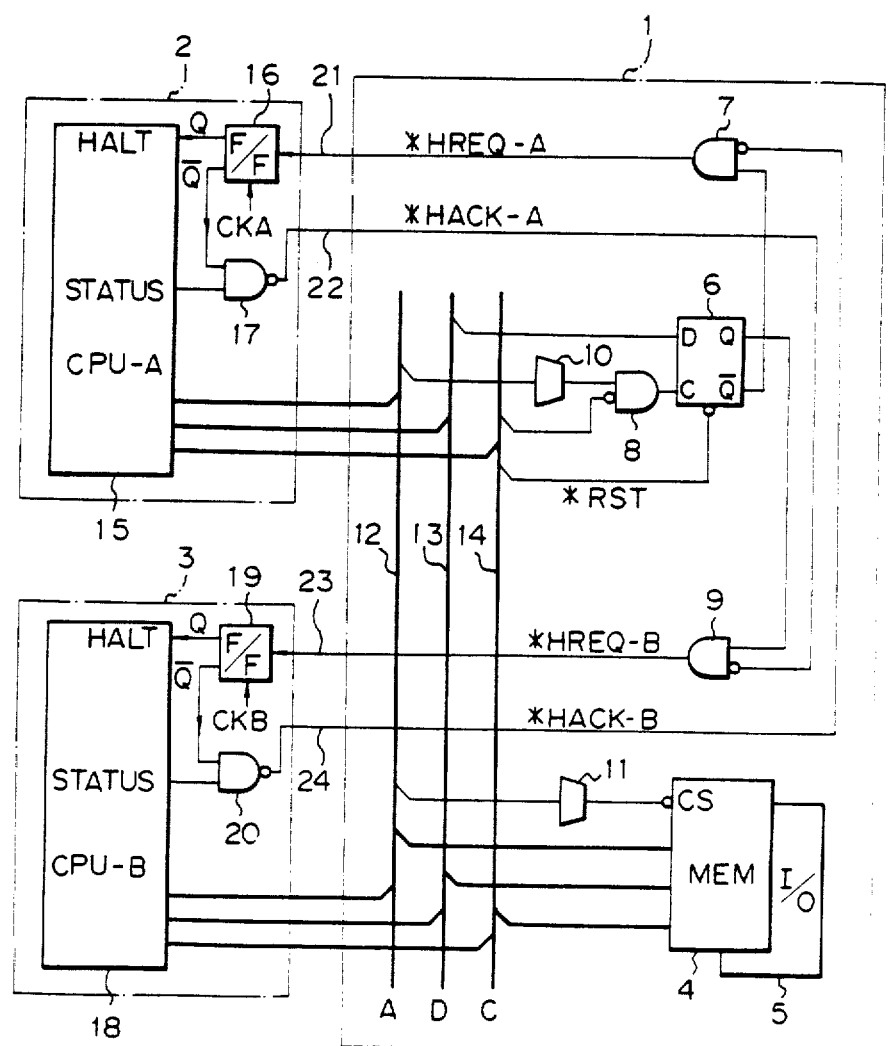
FIG. 1 is a block circuit diagram illustrating a structure of a multiprocessor system as an embodiment of the present invention.

An embodiment of the present invention is explained with reference to the drawings. FIG. 1 illustrates a schematic structure of a multiprocessor system as an embodiment of the present invention. The system illustrated in FIG. 1 comprises a main board 1, and two CPU boards 2 and 3 connected to the main board 1. Arranged on the main board 1, are a common memory 4, a input/output interface circuit 5, a flip-flop 6 acting as a a control register, AND gates 7, 8, and 9, decoders 10 and 11, and so on. Also provided are an address bus 12, a data bus 13, and a control bus 14.

Provided in the CPU board 2, are a first processor (CPU-A) 15, a flip-flop 16, a NAND gate 17, and so on, and provided in the other CPU board 3, are a second processor (CPU-B) 18, a flip-flop 19, a NAND gate 20, and so on. Both the processor 15 of the CPU board 2 and the processor 18 of the CPU board 3 are connected to the address bus 12, the data bus 13, and the control bus 14 in the main board 1. The input terminal of the flip-flop 16 of the CPU board 2 is connected to the output terminal of the AND gate 7 of the main board 1 via a signal line 21, and the output terminal of the NAND gate 17 of the CPU board 2 is connected to the inverting input terminal of the AND gate 9 in the main board 1 via a signal line 22. Similarly, the input terminal of the flip-flop 19 of the CPU board 3 is connected to the output of the AND gate 9 in the main board 1 via a signal line 23, and the output terminal of the NAND gate 20 in the CPU board 3 is connected to the inverting input terminal of the AND gate 7 in the main board 1 via a signal line 24. The switching between the processors 15 and 18 in the CPU boards 2 and 3 is effected by using the four signal lines 21, 22, 23 and 24. It is possible to access and load data in the flip-flop 6 in the main board 1 from each of the processors 15 and 18 of the respective CPU boards 2 and 3. In order to access the flip-flop 6 alternatively from each of the processors 15 and 18, the flip-flop 6 has an address, for example, $FD05. When data is written into the flip-flop 6 from either of the processors 15 or 18, address data designating the address $FD05 is sent to the address bus 12, and write-in data is sent to the data bus 13. The address data sent to the address bus 12 is decoded by the decoder 10 and applied to the clock input terminal C of the flip-flop 6 via the AND gate 8, which is opened by a control signal supplied from the control bus 14. The least significant bit of the data sent to the data bus 13 is input to the data input terminal D of the flip-flop 6. By using the above-mentioned structure, it is possible to effect the write-in to the flip-flop 6 from each of the processors 15 and 18 by designating the aforementioned address $FD05.

Figure 2:
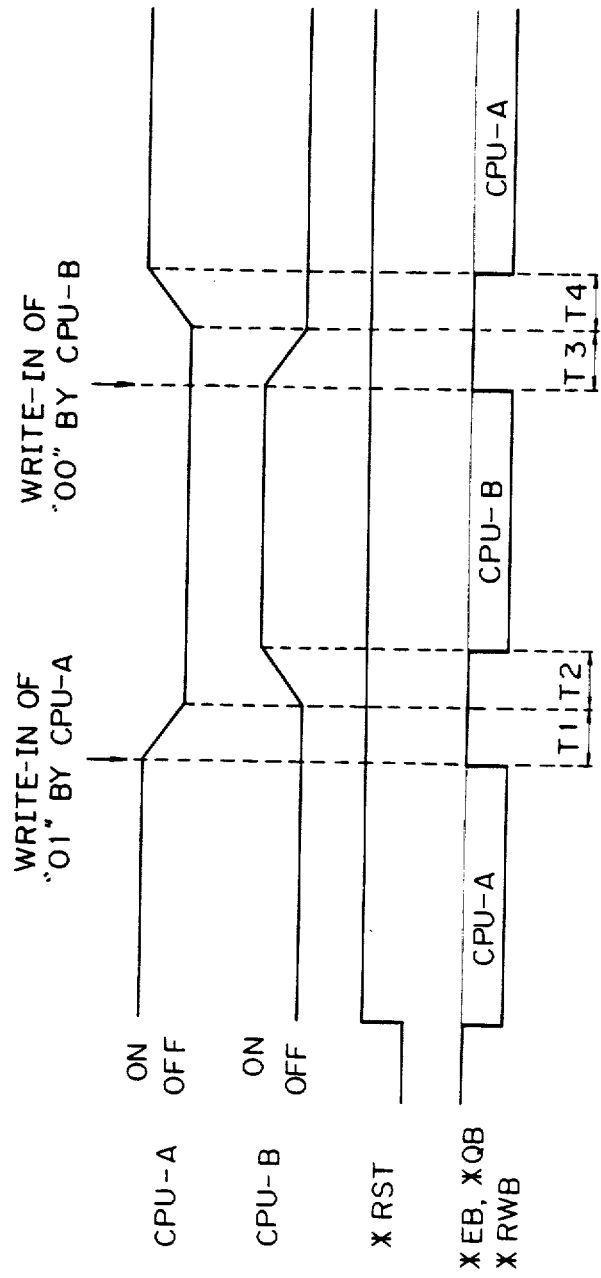
FIG. 2 is a time chart illustrating the operation of the system of FIG. 1.

With reference to FIG. 2, an explanation will be made of the operation of the system of FIG. 1. When the reset signal *RST (where * designates an inverting logic sign i.e., NOT) applied to the flip-flop 6 of the main board 1 changes to low, the flip-flop 6 is reset, so that the output Q of flip-flop 6 becomes low and the output $\overline{Q}$ becomes high. Thereby, the output of the AND gate 9, i.e., a halt request signal *HREQ-B becomes low, the output Q of the flip-flop 19 in the CPU board 3 becomes low, and the potential of the halt signal terminal of the processor 18 becomes low, so that the processor 18 enters a halt condition. When the processor 18 enters the halt condition, the status signal becomes high and since the output $\overline{Q}$ of the flip-flop 19 is high, the potential level of the output of the NAND gate 20, i.e., the signal *HACK-B on the signal line 24 becomes low. Therefore, the output of the AND gate 7 becomes high and the halt request signal *HREQ-A is not input to the CPU board 2, so that the processor 15 enters into an operating condition. In this condition, the address signal, data signal, and basic control signals such as signals *EB and *QB and read write control signal RWB and so on are input to the main board 1 from the processor 15 as long as necessary. That is, after a restart of the system by the above-described process, the processor 15 operates and the processor 18 enters into a halt condition.

When the processor 15 has the operating status, as mentioned above, and when it is necessary to switch the operating processor from the processor 15 to the processor 18, the data "01" is written into the address $FD05 by the processor 15. Thereby, the flip-flop 6 in the main board 1 is set and the outputs Q and $\overline{Q}$ become high and low, respectively. Therefore, the output of the NAND gate 7 becomes low and the halt request signal *HREQ-A is input to the flip-flop 16 in the CPU board 2. Thereby, the outputs Q and $\overline{Q}$ of the flip-flop 16 become low and high, respectively, and the processor 15 halts by itself. When the processor 15 halts, i.e., enters into a stop condition, the status signal thereof becomes high and the output of the NAND gate 17 becomes low, so that the halt acknowledge signal *HACK-A is sent back to the main board 1. As a result, the output of the AND gate 9 becomes high and the halt request signal *HREQ-B applied to the CPU board 3 also becomes high, so that the output of the flip-flop 19 becomes high and the halt condition of the processor 18 is released. Thereby, the processor 18 enters into the operating condition, and the address signal, the data signal, and the above-mentioned control signals *EB, *QB, *RWB and so on are transmitted from the processor 19 to the main board 1. Internal clock signals CKA and CKB applied to the flip-flops 16 and 19 of the CPU boards 2 and 3, respectively, are used for setting or resetting the flip-flops 16 and 19, respectively, in accordance with the internal timings in the corresponding CPU boards. Thus, for example, when a halt request signal is input to one of the CPU boards, differences between the operation timings of the CPU boards are permitted.

When the CPU-A has written "01" into the address $FD05, the CPU-A does not stop instantly, but stops, for example, after the completion of the execution of an instruction which is now being executed. That is, as shown in FIG. 2, it is necessary for the CPU-A to have an undetermined period of time T1 until it stops. The CPU-B also has operating modes in which it is necessary for there to be an undetermined period of time T2 from a halt condition to an operating condition. Therefore, it is necessary to keep the control signals *EB, *QB and *RWB for the memory and the input and output device in a disabled, i.e., a high level condition, between the time just after the CPU-A has written the data "01" to the address $FD05 and the time the CPU-B completely enters into an operating condition. However, as an exception, in a processor such as an 8088 type or 8086 type which effects pipeline control, it is sometimes inappropriate to put the control signals *EB, *QB, *RWB, and so on in the disabled condition immediately after the data, for example, "01", is written into the aforementioned address %FD05. Therefore, when such a processor is used in the multiprocessor system, it is necessary to provide a control circuit in the corresponding CPU board so that the control signals *EB, *QB, *RWB, and so on are not immediately disabled.

When the CPU-B is in the operating condition and the CPU-A is in the halt condition in the above-mentioned manner, if it is necessary to again stop the operation of the CPU-B and to operate the CPU-A, the data "00" is written into the aforementioned address $FD05 by the CPU-B. When the data "00" is written into the address $FD05, the flip-flop 6 in the main board 1 is reset, so that the output Q of the flip-flop 6 becomes low and the output $\overline{Q}$ thereof becomes high. Therefore, the halt request signal *HREQ-B is input to the CPU board 3 in the manner described above for a restart, and the CPU-B changes to the halt condition and the CPU-A changes to the operating condition. The operation in this case is the same as that explained previously, therefore a detailed explanation thereof is omitted here. In FIG. 1, the decoder 11 is used for decoding the upper bits of the address data sent to the address bus 12 and for applying a chip select signal to the chip select terminal CS of the selected memory chip 4. The lower bits of the address data sent to the address bus 12 are input to the memory chip 4 and are used for designating an address within the memory chip.

Figure 3:
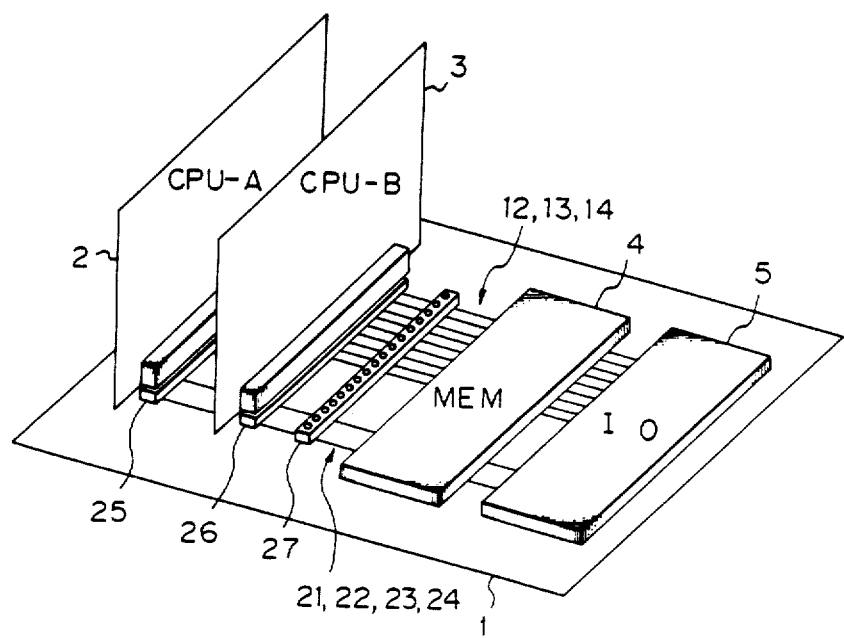
FIG. 3 is a perspective view illustrating a practical circuit board structure of the system of FIG. 1.

FIG. 3 illustrates a practical circuit board structure of a multiprocessor system as an embodiment of the present invention. As shown in FIG. 3, connectors 25, 26, 27, and so on are arranged on a main board 1 beside the common memory 4 and the input/output interface circuit 5. To the connectors 25 and 26 are coupled the CPU boards 2 and 3, respectively. The connector 27 is provided for additionally connecting an interface circuit for a peripheral apparatus, for example, a floppy disc apparatus, a display apparatus, or the like, or connecting another circuit. The connectors 25 and 26 to which the CPU boards 2 and 3 are connected, and so on are connected to bus lines which are arranged on the main board 1 and which are connected to the common memory 4 and the input/output circuit 5 and the like. The bus lines include the above-mentioned address bus 12, data bus 13, control bus 14, and signal lines 21, 22, 23, 24 for switching the processors mounted on the CPU boards 2 and 3.

In the structure shown in FIG. 3, it is possible to plug-in another CPU board including any desired processor to the connectors 25 and 26 instead of the CPU boards 2 and 3 connected thereto, and it is possible to easily switch the operation of the CPU boards including the CPU boards having any desired processors by using the above-mentioned signal lines 21, 22, 23 and 24. It is also possible to use an 8-bit CPU and an 16-bit CPU, for example, the 8086 or 80286 type processors manufactured by Intel Corporation or the 68000 type processor manufactured by Motorola Semiconductor Products, together, by providing bus which are compatible with a 16-bit CPU.

In this way, according to the present invention, it is possible to connect a plurality of CPU boards each including any type of processor to a main board and to switch the operation of each CPU board by using a small number of signal lines. Therefore, software developed for each processor of a personal computer and so on can be well utilized. Moreover, since the switching operation of each CPU board is effected by using a small number of signal lines, the structure of the multiprocessor system is simplified and the reliability thereof is improved.

What is claimed is:

1. A multiprocessor system, comprising:
    a first microprocessor generating a first processor switch signal and a first status signal indicating one of an operating status and a halt status;
    a second microprocessor generating a second processor switch signal and a second status signal indicating one of the operating status and the halt status;
    a common bus operatively connected to said first and second microprocessors;
    a peripheral circuit operatively connected to said common bus;
    a control register operatively connected to said common bus and accessible via said common bus, by both said first and second microprocessors to generate a control signal indicating a halt request status for said first and second microprocessors in dependence upon the first and second processor switch signals;
    a first gate circuit, operatively connected to said first microprocessor and to receive a first halt request signal for said first microprocessor, for producing a first halt acknowledge signal when the first status signal indicates that said first microprocessor is in the halt status;
    a second gate circuit, operatively connected to said second microprocessor and to receive a second halt request signal for the second microprocessor, for producing a second halt acknowledge signal when the second status signal indicates that said second microprocessor is in the halt status;
    a third gate circuit, operatively connected to said first gate circuit, said second gate circuit to receive the second halt acknowledge signal and said control register to receive the control signal, for producing the first halt request signal when the control signal indicates the halt request status for said first microprocessor and for releasing the first halt request signal when the control signal indicates the halt request status for said second microprocessor and the second halt acknowledge signal is received;
    a fourth gate circuit operatively connected to said second gate circuit, said first gate circuit to receive the first halt acknowledge signal and said control register to receive the control signal, for producing the second halt request signal when the control signal indicates the halt request status for the second microprocessor, and for releasing the second halt request signal when the control signal indicates the halt request status for said first microprocessor and the first halt acknowledge signal is received.

2. A multiprocessor system according to claim 1, wherein said first and second gate circuits include a first flip-flop and a second flip-flop, respectively.

3. A multiprocessor system according to claim 2, further comprising:
    a main board holding said common bus, said peripheral circuit, said control register and said third and fourth gate circuits thereon; and
    a plurality of sub-boards, operatively connected to said main board, each of said first and second microprocessors being mounted on one of said sub-boards.

4. A multiprocessor system according to claim 3, wherein said main board includes a plurality of plug-in type connectors attached thereon and said plurality of sub-boards are operatively connected to said main board by using said plug-in type connectors.

5. A multiprocessor system according to claim 3, wherein each of said sub-boards and said main board are operatively connected by at least a control line for transmitting the first and second halt request signals to said first and second microprocessors mounted on each of said sub-boards, respectively, and another control line for transmitting the first and second status signals.

6. A multiprocessor system according to claim 3, wherein each of said sub-boards includes one of first and second flip-flops, operatively connected to the corresponding microprocessor and said main board, controlled by one of the first and second halt request signals, respectively, transmitted from said main board and supplying the halt signal to the corresponding microprocessor.

7. A multiprocessor system according to claim 6, wherein each of said sub-boards further includes one of said first and second gate circuits, operatively connected to one of said first and second flip-flops, said main board and the corresponding microprocessor, for transmitting a halt acknowledge signal to said main board under control of the one of said first and second flip-flops.

8. A multiprocessor system according to claim 3, wherein said common bus comprises an address bus, a data bus and a control bus, all operatively connected to said peripheral circuit and said control register on said main board and to each of said first and second microprocessors mounted on said sub-boards.

9. A multiprocessor system according to claim 8, wherein said main board further comprises decoder means, operatively connected between said address bus and said control register, for enabling access to said control register when one of said first and second microprocessors outputs a predetermined address to said address bus.

10. A multiprocessor system according to claim 1, wherein said multiprocessor system initiates operation by generating a reset signal, and wherein said control register is operatively connected to receive the reset signal, said control register outputting the control signal to indicate the halt request status for said second microprocessor in response to receipt of the reset signal.

11. A multiprocessor system according to claim 1, further comprising decoder means operatively connected between said common bus and said control register, for enabling access to said control register when one of said first and second microprocessors outputs a predetermined address to said common bus.

* * * * *